Oct. 26, 1948.　　　　C. W. YOUNG　　　　2,452,279
HOLDER FOR FISHING POLES
Filed Aug. 14, 1946　　　　　　　　　　2 Sheets-Sheet 1
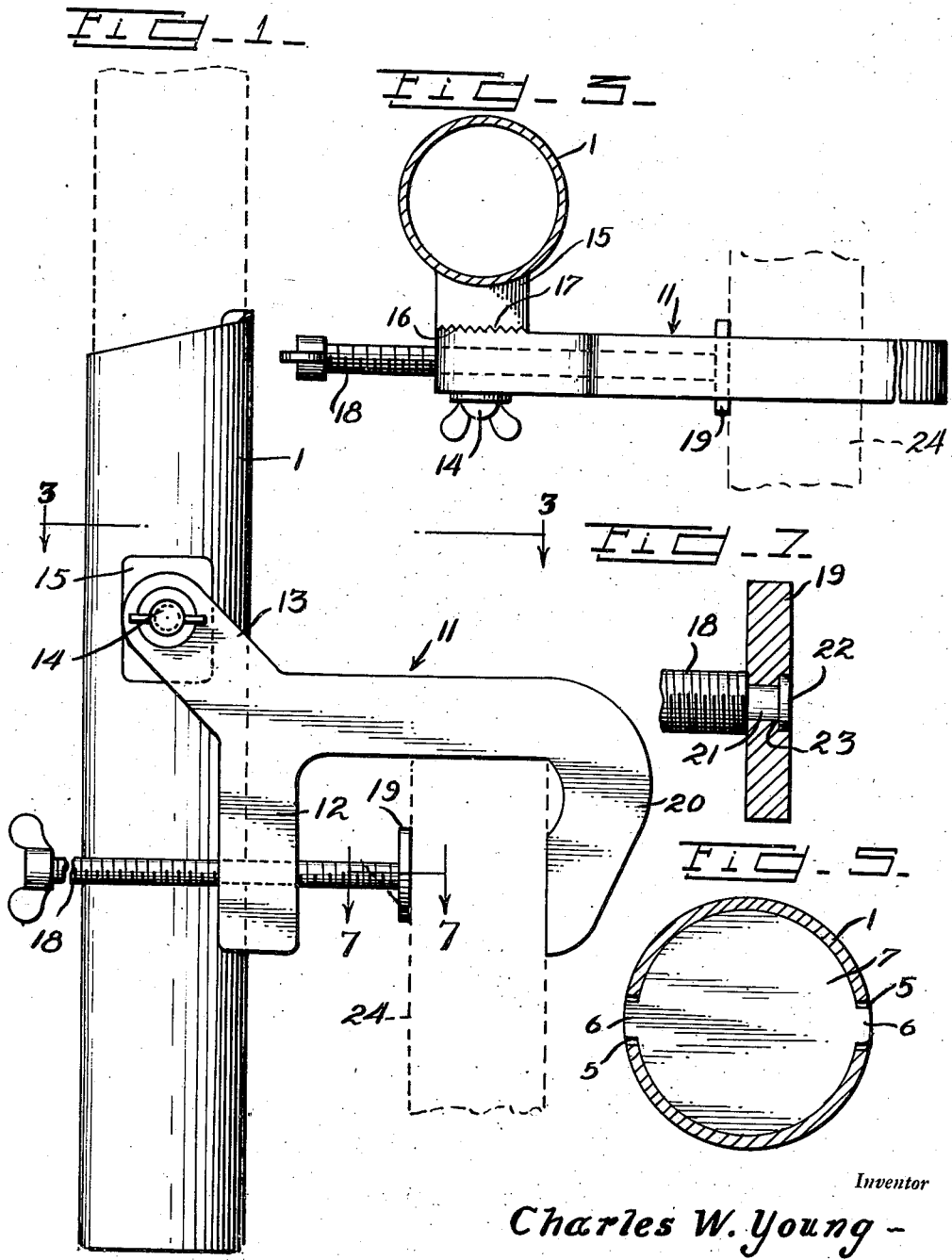
Inventor
Charles W. Young

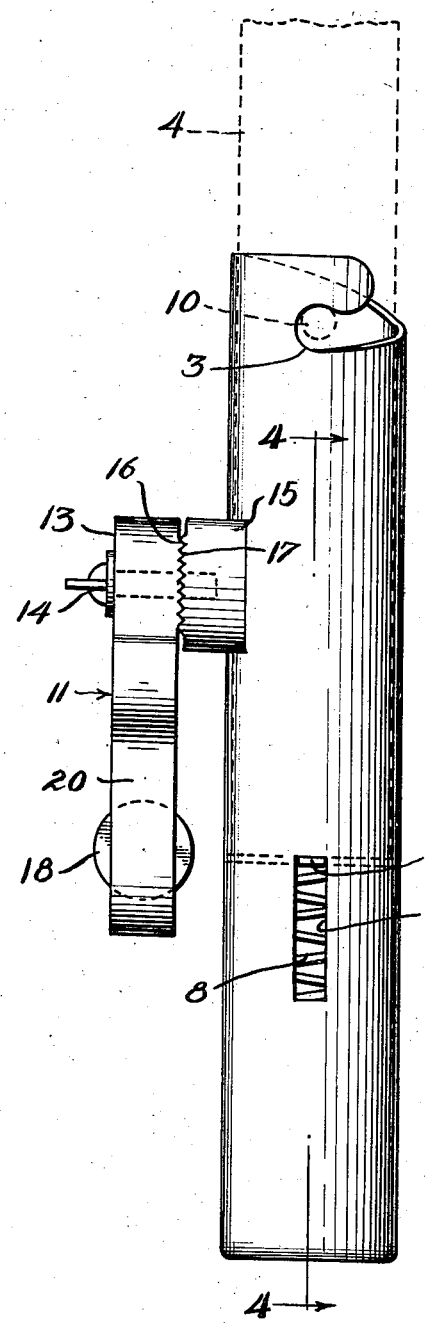
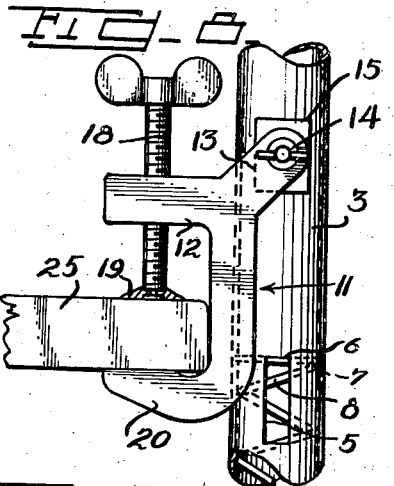
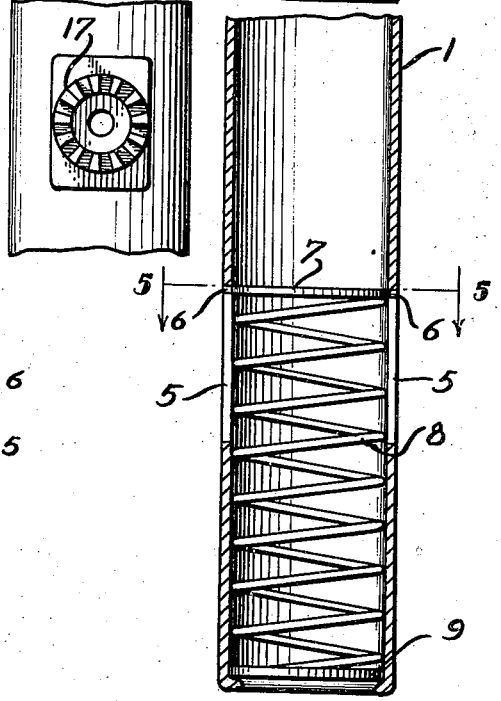

Patented Oct. 26, 1948

2,452,279

UNITED STATES PATENT OFFICE 2,452,279

HOLDER FOR FISHING POLES

Charles W. Young, Cuyahoga Falls, Ohio

Application August 14, 1946, Serial No. 690,482

1 Claim. (Cl. 248—40)

My invention relates to improvements in holders for fishing poles.

The primary object of the invention is to provide a simple form of inexpensive holder for clamping to various parts of a boat to hold a fishing pole upright, in still fishing, or trolling, so that the pole will not be lost overboard, stepped upon and broken, or otherwise damaged, and which is adapted for holding the pole securely therein but for easy quick removal therefrom at will.

Other and subordinate objects, also comprehended by my invention, together with the precise nature of my improvements and the advantages thereof will become readily apparent when the succeeding description and claim are read with reference to the drawings accompanying and forming part of this specification.

In said drawings:

Figure 1 is a view in side elevation of my improved fishing pole holder in a preferred embodiment thereof attached to the gunwale of a boat.

Figure 2 is a view in front elevation of the holder detached.

Figure 3 is a view in horizontal section taken on the line 3—3 of Figure 1.

Figure 4 is a view in vertical section taken on the line 4—4 of Figure 2.

Figure 5 is a view in cross-section taken on the line 5—5 of Figure 4 and drawn to an enlarged scale.

Figure 6 is a fragmentary view in side elevation illustrating the serrated boss.

Figure 7 is a fragmentary view in section taken on the line 7—7 of Figure 1 and drawn to an enlarged scale; and Figure 8 is a view similar to Figure 1, drawn to a smaller scale, and showing my fishing pole holder attached to a boat seat.

Referring to the drawings by numerals, according to my invention, as shown, a tubular socket member 1, with an internal circumferential flange 2 at the bottom thereof, and a side bayonet slot 3 therein adjacent the upper end thereof, is provided for the insertion downwardly therein of a fishing pole, represented in dotted lines at 4. A pair of short, longitudinal, diametrically opposite slots 5 are provided in the socket member 1, at a distance from the bottom thereof suitable for a purpose presently seen, and into which diametrically opposite lugs 6 of a pole seating disc 7 are slidably extended so that said disc 7 is vertically movable in the socket member 1 and held against turning therein. A coil spring 8 in the socket member 1 interposed between the disc 7 and a second disc 9 seating on the flange 2 yieldingly urges the disc 7 upwardly into a limited upward movement established by engagement of the lugs 6 with the upper ends of the slots 5.

As shown in Figure 1, the distance between the disc 7 and the inner end of the bayonet slot 3 is such that when the handle end of a fishing pole 4 of a given size, with the usual lateral finger rest 10 thereon is inserted in the socket member 1 onto the disc 7, said pole may be thrust downwardly and rotated to enter the finger rest 10 in the bayonet slot 3, the downward thrust forcing the disc 7 downwardly in opposition to the coil spring 8. Thus an upward tension is exerted against said pole 4 through the medium of the coil spring 8 and disc 7 to force the finger rest 10 against the upper edge of the bayonet slot 3 so that the pole 4 is securely held in the socket member 1 against displacement.

A substantially C-shaped clamping member 11, with a straight leg 12 forming one end thereof, and an oblique extension 13 at said end, is attached to the socket member 1 adjacent to the upper end thereof by a thumbscrew 14 threaded through said extension 13 into a rectangular boss 15 suitably secured to one side of the socket member 1 in a manner not shown. The thumbscrew 14 provides a pivot about which the clamping member 11 may be swung alongside the socket member 1 about an axis radial to said socket member. Cooperating, circular series of serrations 16, 17 on the extension 13 and on said boss 15, respectively, provide for locking the clamping member 11 in differently swung positions when the thumbscrew 14 is tightened so as to effect interlocking engagement of said series of serrations.

A thumbscrew 18 is threaded through the straight leg 12 of the clamping member 11, with a disc-like foot 19 rotatably secured on the inner end thereof for cooperation with the other leg 20 of said clamping member 11 to attach the same to a support. As shown in Figure 7, the foot 19 is rotatably fitted on a reduced portion 21 of the thumbscrew 18, which portion is upset, as at 22 in a countersink 23 in said foot, whereby the foot 19 may be forced against a support by the thumbscrew 18 without said foot being rotated so as to bite into the support.

As shown in Figure 1, the clamping member 11 may be swung into an angular position, relative to the socket member 1, such that said clamping member may be positioned over the gunwale 24 of a boat, in straddling relation thereto, with the socket member 1 upright, and the thumbscrew 18 may then be tightened to attach the holder to such a support. By loosening the thumbscrew 14, the socket member 1 may be tilted relative to the clamping member 11 to tilt the pole 4 away from or toward the gunwale 24, as desired.

As shown in Figure 8, the clamping member 11 may be swung relative to the socket member 1 into a position at substantially a right angle to its position as shown in Figure 1, so that said clamping member 11 may be positioned to straddle a boat seat 25, or the like, with the socket member 1 and pole 4 upright, and the thumbscrew 18 on top of said seat for turning conveniently to attach the holder to said seat, in a manner which will be clear.

The foregoing will, it is believed, suffice to impart a clear understanding of my invention and the advantages thereof, without further explanation.

Manifestly, the invention, as described, is susceptible of modification without departing from the inventive concept, and right is herein reserved to such modifications as fall within the scope of the appended claim.

I claim as my invention:

A holder for a fishing pole of the type having a lateral finger rest on the handle end thereof, said holder comprising a tubular socket member adapted for the insertion of said handle end downwardly into the same and being provided with a bayonet slot in the upper end thereof into which said finger rest may be inserted by rotation of said handle end in the socket member, means in said socket member forming a seat for said handle end and adapted to exert pressure upwardly against the same when the finger rest is inserted in said slot to thereby prevent said handle end from being accidentally rotated to withdraw the finger rest out of said slot, and means for attaching said socket member to a support in upright position for swinging adjustment into different inclined positions, the first mentioned means comprising a seat forming disc in the socket member vertically slidable therein, a coil spring in said socket member backing said disc, and coacting lugs and slots on said disc and in said socket member, respectively, for limiting sliding movement of said disc upwardly and preventing rotation of said disc in said socket member.

CHARLES W. YOUNG.

REFERENCES CITED

The following references are of record in the file of this patent:

UNITED STATES PATENTS

| Number | Name | Date |
|---|---|---|
| 931,437 | Larson | Aug. 17, 1909 |
| 1,505,318 | Berlow | Aug. 19, 1924 |
| 2,055,842 | Haislip | Sept. 29, 1936 |
| 2,414,358 | Calway | Jan. 14, 1947 |